US012671192B2

(12) United States Patent
Miyamura et al.

(10) Patent No.: US 12,671,192 B2
(45) Date of Patent: Jun. 30, 2026

(54) COMBINATION TERMINAL INCLUDING RESILIENT LOCK PIECE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tetsuya Miyamura, Mie (JP); Hideto Nakamura, Mie (JP); Shinji Nozaki, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 308 days.

(21) Appl. No.: 18/565,992

(22) PCT Filed: May 27, 2022

(86) PCT No.: PCT/JP2022/021718
§ 371 (c)(1),
(2) Date: Nov. 30, 2023

(87) PCT Pub. No.: WO2022/264780
PCT Pub. Date: Dec. 22, 2022

(65) Prior Publication Data

US 2024/0380140 A1 Nov. 14, 2024

(30) Foreign Application Priority Data

Jun. 15, 2021 (JP) ................................ 2021-099236

(51) Int. Cl.
*H01R 11/32* (2006.01)
*H01R 4/18* (2006.01)
*H01R 11/12* (2006.01)

(52) U.S. Cl.
CPC ............ *H01R 11/32* (2013.01); *H01R 11/12* (2013.01); *H01R 4/184* (2013.01)

(58) Field of Classification Search
CPC ...... H01R 11/32; H01R 4/184; H01R 13/113; H01R 11/28; H01R 11/12; H01R 4/64;
(Continued)

(56) References Cited

U.S. PATENT DOCUMENTS 5,834,696 A 11/1998 Kurosawa et al.
7,867,044 B2 * 1/2011 Lee ....................... H01R 11/12 439/108

(Continued)

FOREIGN PATENT DOCUMENTS

JP H11-067305 A 3/1999
JP 2004-146116 A 5/2004

(Continued)

OTHER PUBLICATIONS

International Search Report issued on Jul. 12, 2022 for WO 2022/264780 A1 (4 pages).

*Primary Examiner* — Edwin A. Leon
(74) *Attorney, Agent, or Firm* — Venjuris, P.C.

(57) ABSTRACT

A combination terminal includes a first terminal fitting (11) including a first base plate portion (12) and a second terminal fitting (51) including a second base plate portion (52) to be stacked on the first base plate portion (11), the second terminal fitting (51) being assembled with the first terminal fitting (11) by being displaced in a direction intersecting a stacking direction. The first terminal fitting (11) is formed with a resiliently deformable resilient lock piece
(Continued)

(20). The second terminal fitting (51) is formed with a lock portion (56) for locking the first and second terminal fittings (11, 51) in an assembled state by being locked to the resilient lock piece (20). A protecting member (40) for preventing interference of an external matter with the resilient lock piece (20) is attached to the first terminal fitting (11).

8 Claims, 10 Drawing Sheets

(58) Field of Classification Search
CPC ........ H01R 4/185; H01R 13/42; H01R 13/02; H01R 13/648
See application file for complete search history.

(56) References Cited

U.S. PATENT DOCUMENTS

| | | | | |
|---|---|---|---|---|
| 9,300,093 | B2 * | 3/2016 | Omori | H01R 13/648 |
| 9,450,323 | B2 * | 9/2016 | Ohkubo | H01R 35/04 |
| 10,516,221 | B1 * | 12/2019 | Albrecht | H01R 11/287 |
| 2009/0009981 | A1 * | 1/2009 | Shimizu | H02G 3/081<br>361/807 |
| 2016/0329644 | A1 * | 11/2016 | Tabata | H01R 4/66 |
| 2017/0310021 | A1 * | 10/2017 | Tsuchiya | H01R 33/97 |

FOREIGN PATENT DOCUMENTS

| | | | |
|---|---|---|---|
| JP | 2006-012608 | A | 1/2006 |
| JP | 2022-079222 | A | 5/2022 |

* cited by examiner

COMBINATION TERMINAL INCLUDING RESILIENT LOCK PIECE

CROSS REFERENCE TO RELATED APPLICATIONS

This application is a national phase of PCT application No. PCT/JP2022/021718, filed on 27 May 2022, which claims priority from Japanese patent application No. 2021-099236, filed on 15 Jun. 2021, all of which are incorporated herein by reference.

TECHNICAL FIELD

The present disclosure relates to a combination terminal.

BACKGROUND

Patent Document 1 discloses a structure for assembling a first terminal body and a second terminal body. Each terminal body is shaped by connecting a pair of plate-like overlapping portions via a stepped coupling portion. The two terminal bodies are assembled by alternately overlapping the plate-like overlapping portions and the coupling portions. The two terminal bodies are locked in an assembled state by fitting lock protrusions formed on the plate-like overlapping portions of one terminal body into lock holes formed in the plate-like overlapping portions of the other terminal body.

PRIOR ART DOCUMENT

Patent Document

Patent Document 1: JP H11-067305 A

SUMMARY OF THE INVENTION

Problems to be Solved

In the process of assembling the terminal bodies, the lock protrusions are rubbed while being strongly pressed against the mating plate-like overlapping portions, whereby a large sliding resistance is generated. Thus, it is difficult to manually assemble the terminal bodies.

A combination terminal of the present disclosure was completed on the basis of the above situation and aims to enable manual assembly.

Means to Solve the Problem

The present disclosure is directed to a combination terminal with a first terminal fitting including a first base plate portion and a second terminal fitting including a second base plate portion to be stacked on the first base plate portion, the second terminal fitting being assembled with the first terminal fitting by being displaced in a direction intersecting a stacking direction, the first terminal fitting being formed with a resiliently deformable resilient lock piece, the second terminal fitting being formed with a lock portion for locking the first and second terminal fittings in an assembled state by being locked to the resilient lock piece, and a protecting member for preventing interference of an external matter with the resilient lock piece being attached to the first terminal fitting.

Effect of the Invention

According to the present disclosure, manual assembly is possible.

DETAILED DESCRIPTION TO EXECUTE THE INVENTION

Description of Embodiments of Present Disclosure

Figure 1:
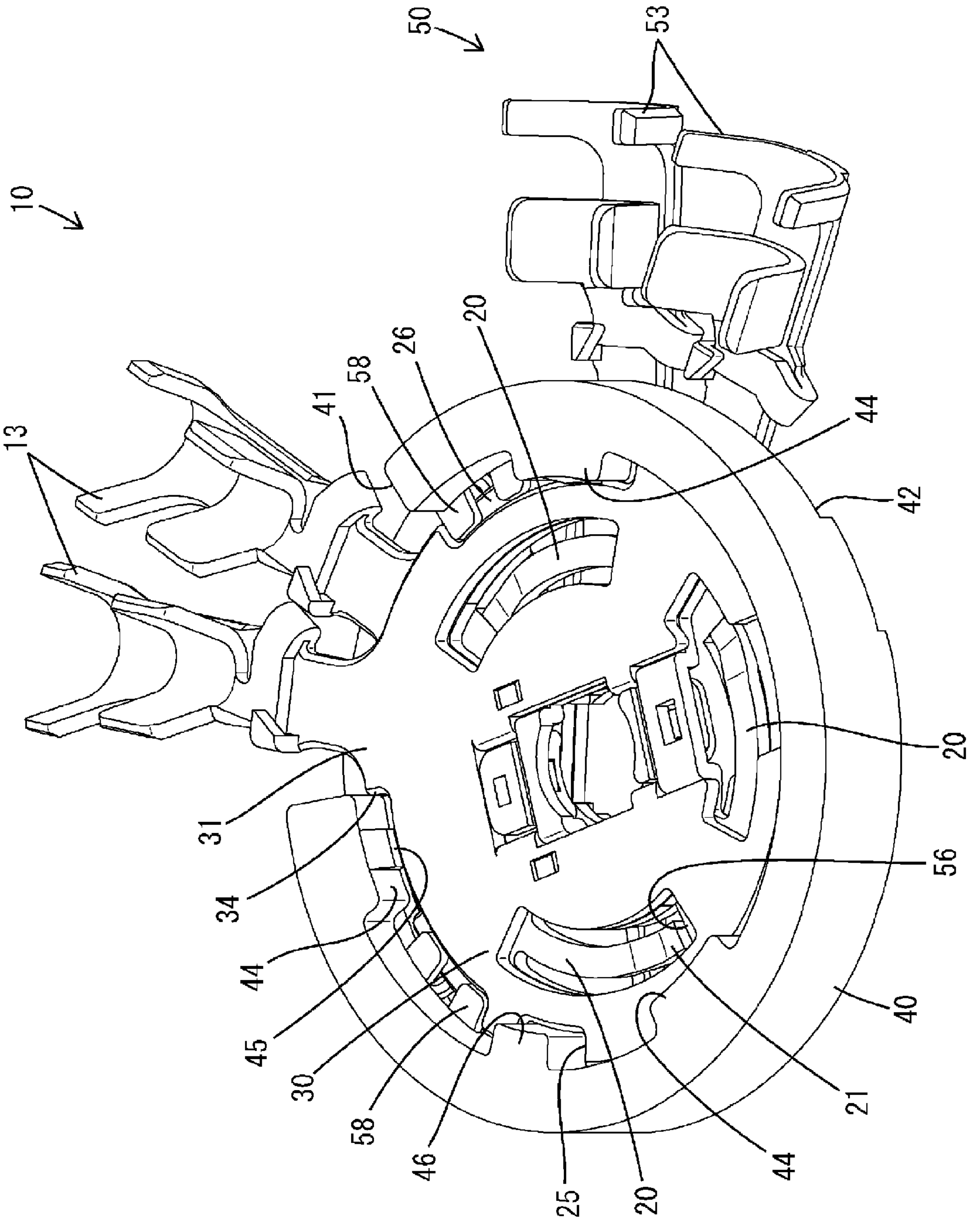
FIG. 1 is a perspective view of a combination terminal of one embodiment.
Figure 2:
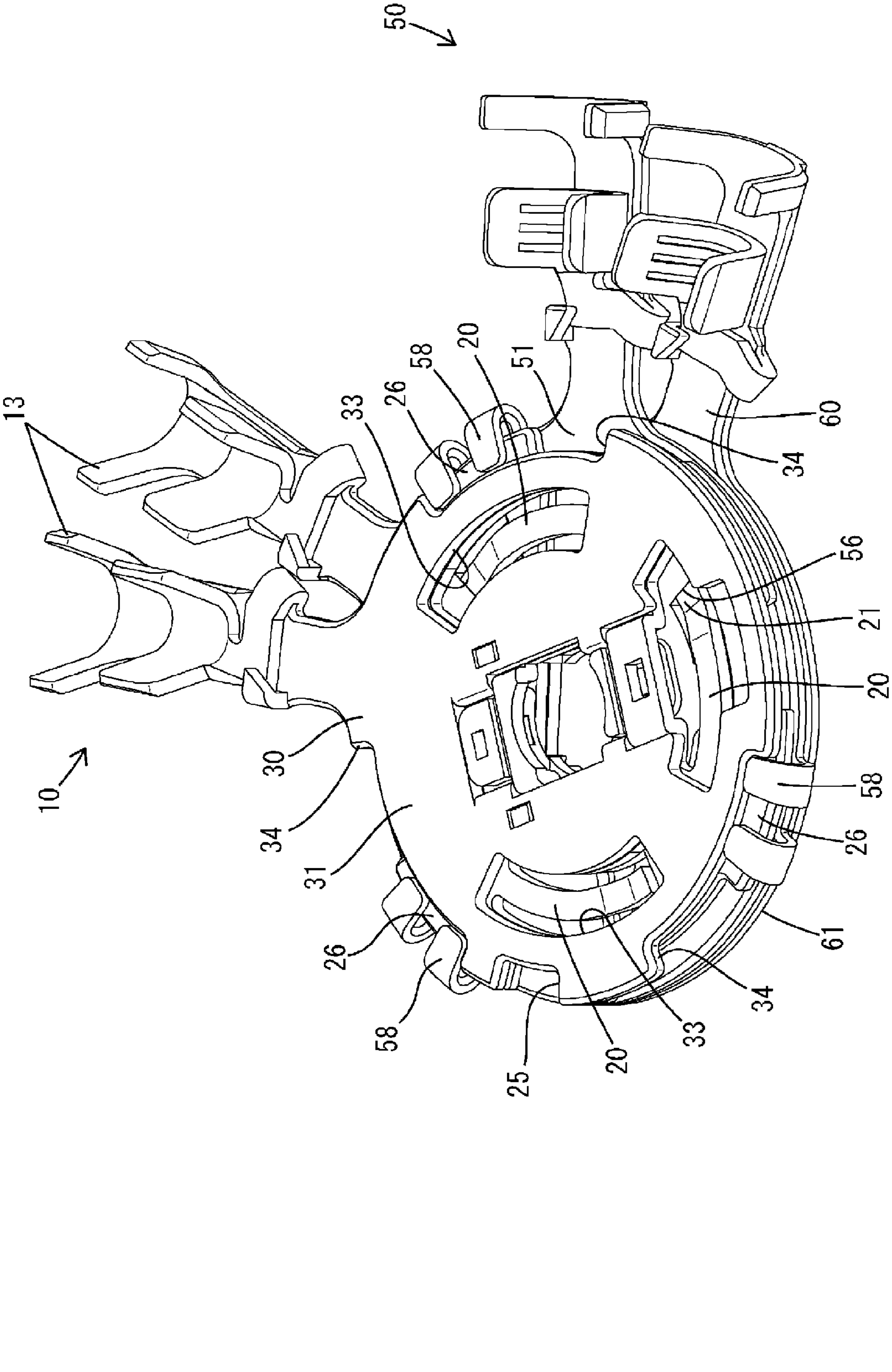
FIG. 2 is a perspective view showing an assembled state of a first terminal module and a second terminal module.
Figure 3:
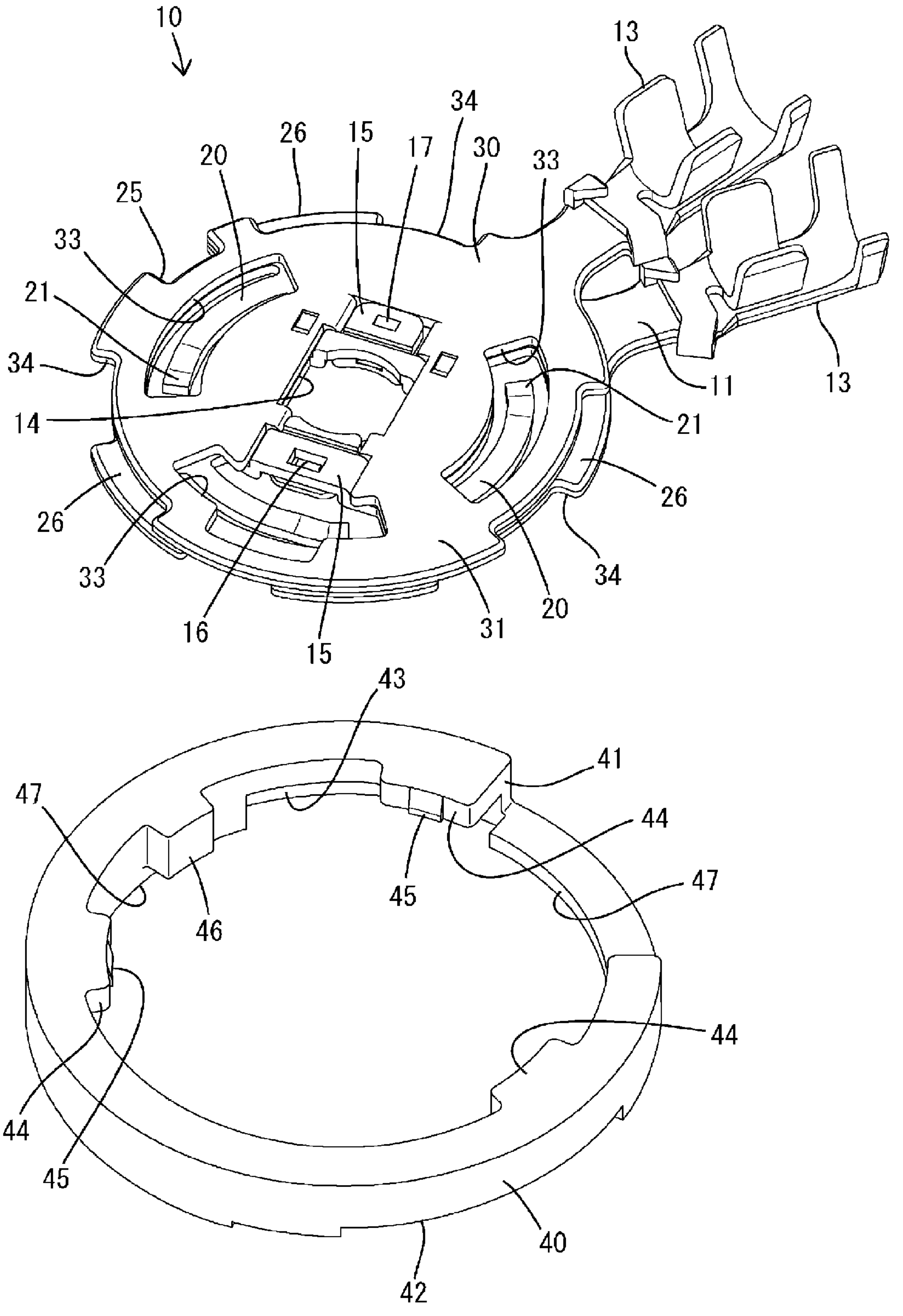
FIG. 3 is a perspective view showing a separated state of the first terminal module and a protecting member.

First, embodiments of the present disclosure are listed and described.

(1) The combination terminal of the present disclosure is provided with a first terminal fitting including a first base plate portion and a second terminal fitting including a second base plate portion to be stacked on the first base plate portion, the second terminal fitting being assembled with the first terminal fitting by being displaced in a direction intersecting a stacking direction, the first terminal fitting being formed with a resiliently deformable resilient lock piece, the second terminal fitting being formed with a lock portion for locking the first and second terminal fittings in an assembled state by being locked to the resilient lock piece, and a protecting member for preventing interference of an external matter with the resilient lock piece being attached to the first terminal fitting. According to the configuration of the present disclosure, the resilient lock piece is resiliently deformed in the process of assembling the first and second terminal fittings. Since resistance generated in the process of assembling the both terminal fittings is small as compared to the case where terminal fittings are assembled while a resiliently undeformable projection is strongly rubbed against the mating terminal fitting, manual assembly is possible. Since the interference of an external matter with the resilient lock piece is prevented by the protecting member, the reliability of a locking function by the resilient lock piece and the lock portion is high.

(2) Preferably, the protecting member has a guide surface to be brought into sliding contact with the second terminal fitting in the process of assembling the first and second terminal fittings. According to this configuration, workability when the both terminal fittings are assembled is good. The shape of the first terminal fitting can be simplified as compared to the case where a dedicated guide surface is formed on the first terminal fitting.

(3) Preferably, the first and second terminal fittings are assembled while being relatively rotated, and the resilient lock piece has an arc shape extending concentrically with a center of rotation at the time of assembling the first and second terminal fittings. According to this configuration, a large extension dimension of the resilient lock piece can be ensured even without increasing external dimensions of the first terminal fitting. In this way, sliding resistance due to the resilient deformation of the resilient lock piece can be reduced in the process of assembling the first and second terminal fittings.

(4) Preferably, a first sub-terminal is provided which is stacked and assembled with the first terminal fitting, and the first terminal fitting and the first sub-terminal are formed with a positioning portion for positioning the second terminal fitting when assembly of the first and second terminal fittings is started. According to this configuration, workability when the first and second terminal fittings are assembled is good.

(5) Preferably, a first sub-terminal is provided which is stacked and assembled with the first terminal fitting from a side opposite to the second terminal fitting, the resilient lock piece is resiliently displaced toward the first sub-terminal due to interference with the second terminal fitting in the process of assembling the first and second terminal fittings and resiliently returns and is locked to the lock portion when assembly of the first and second terminal fittings is completed, and the first sub-terminal is formed with a deflection allowance space for enabling resilient deformation of the resilient lock piece. According to this configuration, since the deflection allowance space during a resilient displacement of the resilient lock piece is secured within a thickness range of the first sub-terminal, it is not necessary to secure the deflection allowance space for the resilient lock piece between the first terminal fitting and the first sub-terminal.

(6) Preferably, the first base plate portion includes a projection-like contact point portion to be brought into contact with the second base plate portion with assembly of the first and second terminal fittings completed, and the second base plate portion is formed with an interference avoiding portion for avoiding interference with the contact point portion when the assembly of the first and second terminal fittings is started. According to this configuration, since the contact point portion is accommodated into the interference avoiding portion when the assembly of the first and second terminal fittings is started, the first and second base plate portions can be stacked without forming any gap therebetween.

DETAILS OF EMBODIMENT OF PRESENT DISCLOSURE

Embodiment 1

One specific embodiment of the present disclosure is described below with reference to FIGS. 1 to 10. Note that the present invention is not limited to these illustrations, but is represented by claims and intended to include all changes in the scope of claims and in the meaning and scope of equivalents. In this embodiment, upper and lower sides shown in FIGS. 1 to 5, 7 and 8 are directly defined as upper and lower sides concerning a vertical direction.

A combination terminal of this embodiment is configured by assembling a first terminal module 10, a protecting member 40 and a second terminal module 50. The first terminal module 10 is configured by assembling one first terminal fitting 11 and one first sub-terminal 30. The protecting member 40 is a single component. The second terminal module 50 is configured by assembling one second terminal fitting 51 and one second sub-terminal 60.

(First Terminal Module 10)

Figure 4:
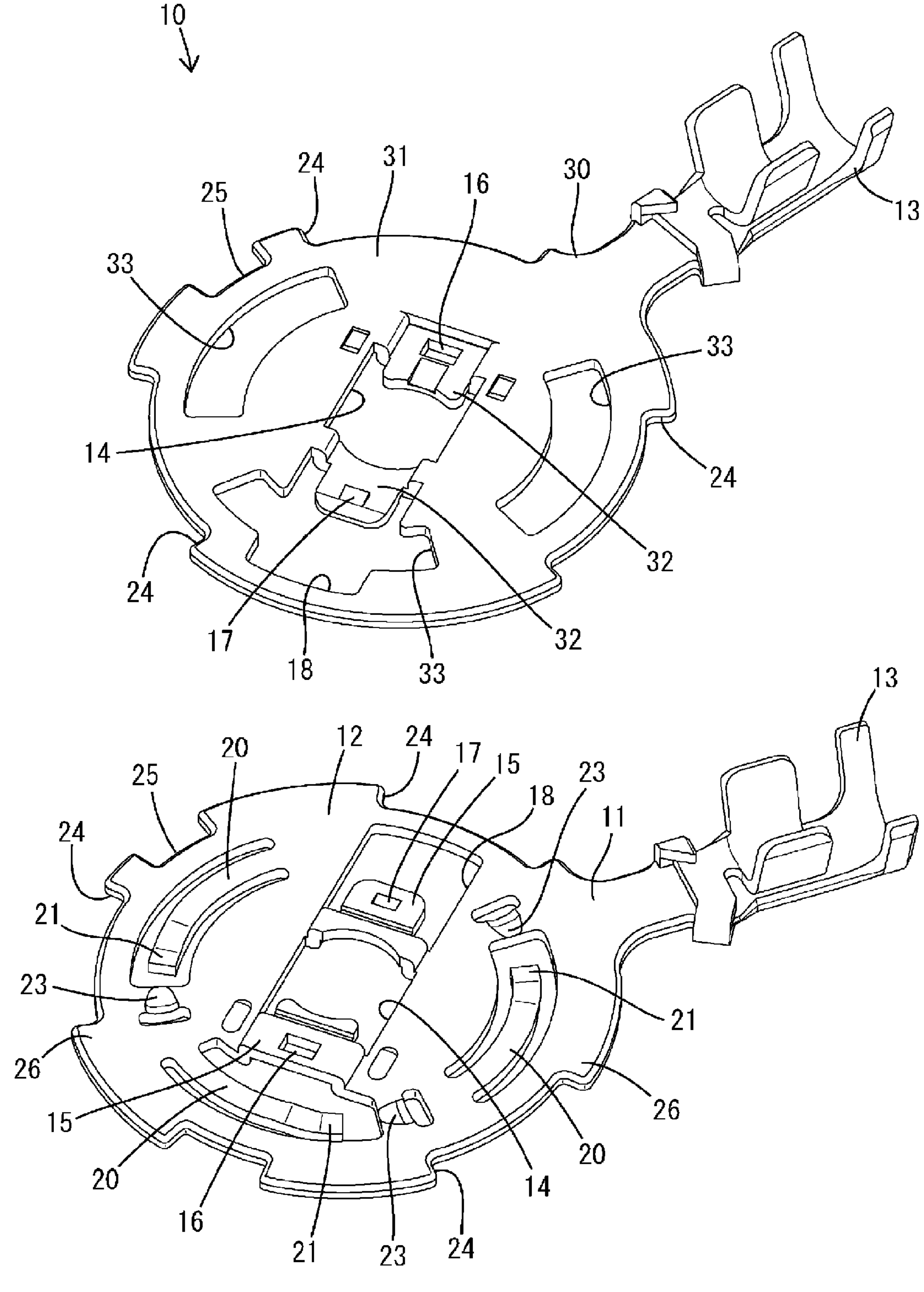
FIG. 4 is a perspective view showing a separated state of a first terminal fitting and a first sub-terminal.

The first terminal fitting 11 is a single component formed, such as by bending a metal plate material having a predetermined shape. As shown in FIG. 4, the first terminal fitting 11 includes a first base plate portion 12 having a plate thickness direction oriented in the vertical direction and a first crimping portion 13 in the form of an open barrel. The first base plate portion 12 is circular in a plan view. The first crimping portion 13 projects radially outward from the outer peripheral edge of the first base plate portion 12. A first bolt hole 14 penetrating through the first base plate portion 12 in the plate thickness direction is formed in a central part of the first base plate portion 12.

A pair of first covering portions 15 arranged across a center of the first bolt hole 14 are formed on a hole edge part of the first bolt hole 14. The first covering portions 15 are arranged at positions higher than the first base plate portion 12 via steps by a plate thickness of the first base plate portion 12. One first covering portion 15 is formed with a locking hole 16, and the other first covering portion 15 is formed with a downward projecting locking projection 17. A through hole 18 is formed at a position of the first base plate portion 12 on a side opposite to the first bolt hole 14 across the other first covering portion 15.

The first base plate portion 12 is formed with three resilient lock pieces 20. The three resilient lock pieces 20 are elongated along a circumferential direction concentric with the first bolt hole 14. The three resilient lock pieces 20 are arranged at intervals in the circumferential direction. In a plan view of the first base plate portion 12, the three resilient lock pieces 20 have an arc shape and are cantilevered in a counterclockwise direction.

The resilient lock piece 20 can be resiliently displaced in the plate thickness direction of the first base plate portion 12, i.e. in a vertical direction, with a base end part connected to the first base plate portion 12, out of both circumferential end parts, as a fulcrum. When the resilient lock piece 20 is viewed in a direction (radial direction) perpendicular to the plate thickness direction of the first base plate portion 12 from a center of the circular first base plate portion 12, the resilient lock piece 20 is oblique to the first base plate portion 12. In a free state where the resilient lock piece 20 is not resiliently displaced, an extending end part 21 of the resilient lock piece 20 is arranged to project further downward than the first base plate portion 12.

The first base plate portion 12 is formed with three projection-like contact point portions 23. The three contact point portions 23 are formed by partially striking the first base plate portion 12 to project downward. The contact point portion 23 has a triangular shape having a vertex on a front side in a clockwise direction in a plan view. In the plan view, the contact point portions 23 are located on a circumference having the same center and diameter as a circumference on which the resilient lock pieces 20 are located, and arranged adjacent to the extending end parts 21 of the resilient lock pieces 20 in the circumferential direction.

The first base plate portion 12 is formed with three positioning recesses 24 spaced apart in the circumferential direction and one rotation stop recess 25. The three positioning recesses 24 are shaped by cutting an outer peripheral edge part of the first base plate portion 12 into an arc shape concentric with the first base plate portion 12. Out of the outer peripheral edge part of the first base plate portion 12, parts adjacent to the positioning recesses 24 in the counterclockwise direction function as plate-like fitting portions 26. The rotation stop recess 25 is shaped by cutting the outer peripheral edge part of the first base plate portion 12 into an arc shape concentric with the first base plate portion 12. A circumferential length of the rotation stop recess 25 is shorter than that of one positioning recess 24.

The first sub-terminal 30 is a single component formed, such as by bending a metal plate material having a predetermined shape. The first sub-terminal 30 includes a first plate-like base portion 31 having a plate thickness direction oriented in the vertical direction and a first crimping portion 13 in the form of an open barrel. The first plate-like base portion 31 is circular in a plan view. The first crimping portion 13 projects radially outward from the outer peripheral edge of the first plate-like base portion 31. A first bolt hole 14 penetrating through the first plate-like base portion 31 in the plate thickness direction is formed in a central part of the plate-like base portion 31.

A pair of first receiving portions 32 arranged across a center of the first bolt hole 14 are formed on a hole edge part of the first bolt hole 14. The first receiving portions 32 are arranged at positions lower than the first plate-like base portion 31 via steps by a plate thickness of the first plate-like base portion 31. One first receiving portion 32 is formed with a locking hole 16, and the other first receiving portion 32 is formed with an upward projecting locking projection 17. A through hole 18 is formed at a position of the first plate-like base portion 31 on a side opposite to the first bolt hole 14 across the other first receiving portion 32.

The first plate-like base portion 31 is formed with three deflection allowance spaces 33 penetrating through the first plate-like base portion 31 in the plate thickness direction. The three deflection allowance spaces 33 are arranged at intervals in the circumferential direction. The deflection allowance space 33 is elongated along the circumferential direction concentric with the first bolt hole 14, similarly to the resilient lock piece 20. In a plan view of the first plate-like base portion 31, the three deflection allowance spaces 33 have an arc shape. A part of one of the three deflection allowance spaces 33 is common to an opening range of the through hole 18.

The first plate-like base portion 31 is formed with three positioning recesses 24 spaced apart in the circumferential direction and one rotation stop recess 25. The three positioning recesses 24 are shaped by cutting an outer peripheral edge part of the first plate-like base portion 31 into an arc shape concentric with the first plate-like base portion 31. The rotation stop recess 25 is shaped by cutting the outer peripheral edge part of the first plate-like base portion 31 into an arc shape concentric with the first plate-like base portion 31. A circumferential length of the rotation stop recess 25 is shorter than that of one positioning recess 24.

With the first terminal fitting 11 and the first sub-terminal 30 assembled, the first plate-like base portion 31 is staked on the upper surface of the first base plate portion 12 and the first covering portions 15 are stacked on the upper surfaces of the first receiving portions 32, whereby the first terminal fitting 11 and the first sub-terminal 30 are held not to be separated in the plate thickness direction. By locking the locking hole 16 and the locking projection 17 of the first receiving portions 32 to the locking projection 17 and the locking hole 16 of the first covering portions 15, the first terminal fitting 11 and the first sub-terminal 30 are held not to be separated in a horizontal direction orthogonal to a stacking direction.

In an assembled state of the first terminal module 10 and the first sub-terminal 30, the first bolt hole 14 of the first terminal fitting 11 and the first bolt hole 14 of the first sub-terminal 30 are coaxially arranged and the first crimping portion 13 of the first terminal fitting 11 and the first crimping portion 13 of the first sub-terminal 30 are adjacently arranged in the circumferential direction. In a plan view, the three resilient lock pieces 20 are entirely and individually arranged in the three deflection allowance spaces 33. Since the resilient lock piece 20 is accommodated into the deflection allowance space 33 when being resiliently displaced upward, the resilient lock piece 20 does not interfere with the first plate-like base portion 31.

The entire region of the rotation stop recess 25 of the first terminal fitting 11 and the entire region of the rotation stop recess 25 of the first sub-terminal 30 overlap in the circumferential direction. Parts of the positioning recesses 24 of the first terminal fitting 11 and parts of the positioning recesses 24 of the first sub-terminal 30 overlap in the circumferential direction. Three spaces where the positioning recesses of the both terminals overlap function as positioning portions 34 arranged at intervals in the circumferential direction. In a plan view, the three plate-like fitting portions 26 of the first terminal fitting 11 are arranged adjacent to the three positioning portions 34 in the counterclockwise direction.

(Protecting Member 40)

The protecting member 40 is a ring-shaped single component circular in a plan view. The protecting member 40 is formed with one first cut portion 41. The first cut portion 41 is shaped by recessing only a circumferential part of the upper surface of the protecting member 40. The first cut portion 40 is open in the upper surface, inner peripheral surface and outer peripheral surface of the protecting member 40. The protecting member 40 is formed with one second cut portion 42. The second cut portion 42 is shaped by recessing only a circumferential part of the lower surface of the protecting member 40. The second cut portion 40 is open in the lower surface, inner peripheral surface and outer peripheral surface of the protecting member 40. The first and second cut portions 41, 42 are arranged in regions different in the circumferential direction.

The protecting member 40 is formed with three third cut portions 43 spaced apart in the circumferential direction. The third cut portions 43 are shaped by recessing only circumferential parts of the lower surface of the protecting member 40. Each third cut portion 43 is open in the lower surface and inner peripheral surface of the protecting member 40, but is not open in the outer peripheral surface of the protecting member 40. One of the three third cut portions 43 communicates with the second cut portion 42.

The protecting member 40 is formed with three projecting portions 44 spaced apart in the circumferential direction. The three projecting portions 44 project radially inward from an upper end part of the inner peripheral surface of the protecting member 40. The projecting portion 44 has an arcuate plan view shape concentric with the protecting member 40. A retaining projection 45 projecting radially inward is formed on the inner peripheral surface of the projecting portion 44. The retaining projection 45 has such a tapered shape that a projecting dimension from the projecting portion 44 gradually increases toward a lower side.

The protecting member 40 is formed with one rotation stop protrusion 46. The rotation stop protrusion 46 is shaped to project radially inward from an upper end side region of the outer peripheral surface of the protecting member 40. The upper surface of the rotation stop protrusion 46 is continuous and flush with the upper surface of the protecting member 40. The lower surface of the rotation stop protrusion 46 is located below the lower surfaces of the projecting portions 44.

Figure 6:
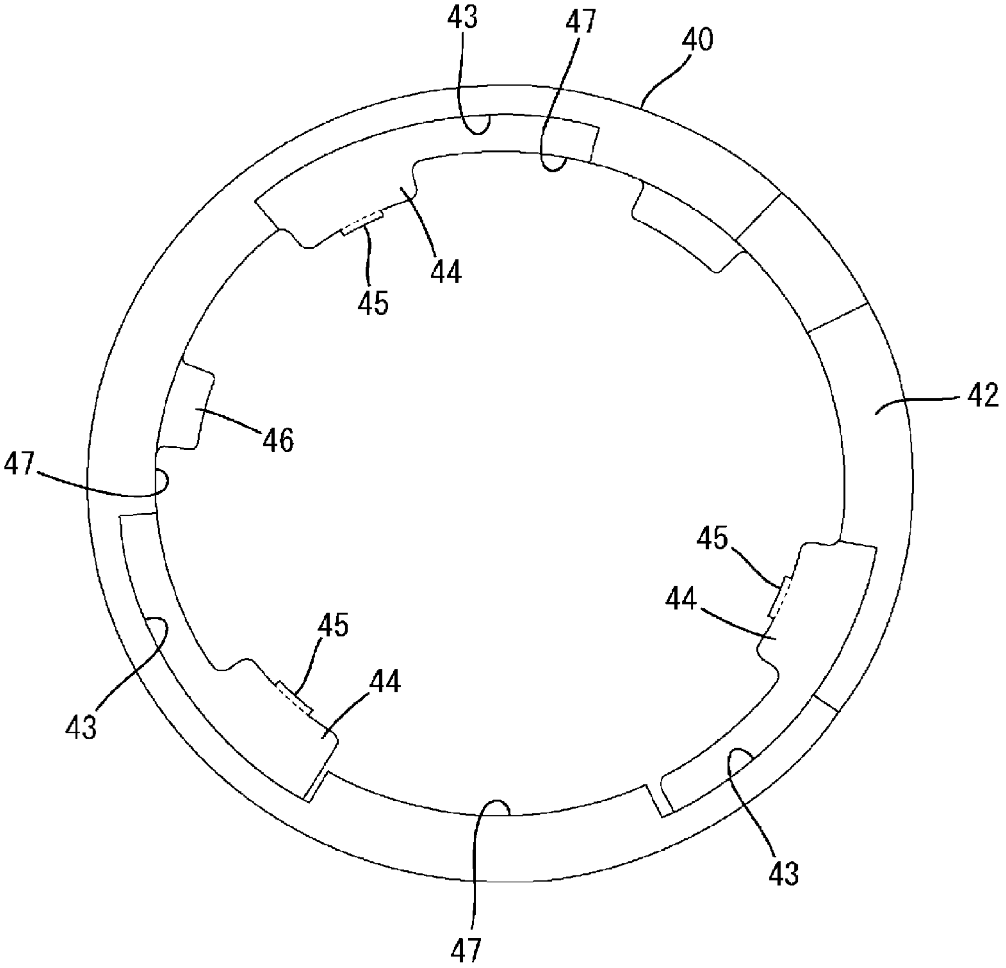
FIG. 6 is a bottom view of the protecting member.

Regions below the lower surfaces of the projecting portions 44 in the vertical direction, out of the inner peripheral surface of the protecting member 40, function as guide surfaces 47 having an arc shape concentric with the protecting member 40. The guide surfaces 47 are interrupted at the second cut portion 42 and the three third cut portions 43. As shown in FIG. 6, all the guide surfaces 47 are arranged on one circumference having the same center and diameter in a bottom view of the protecting member 40.

(Second Terminal Module 50)

Figure 7:
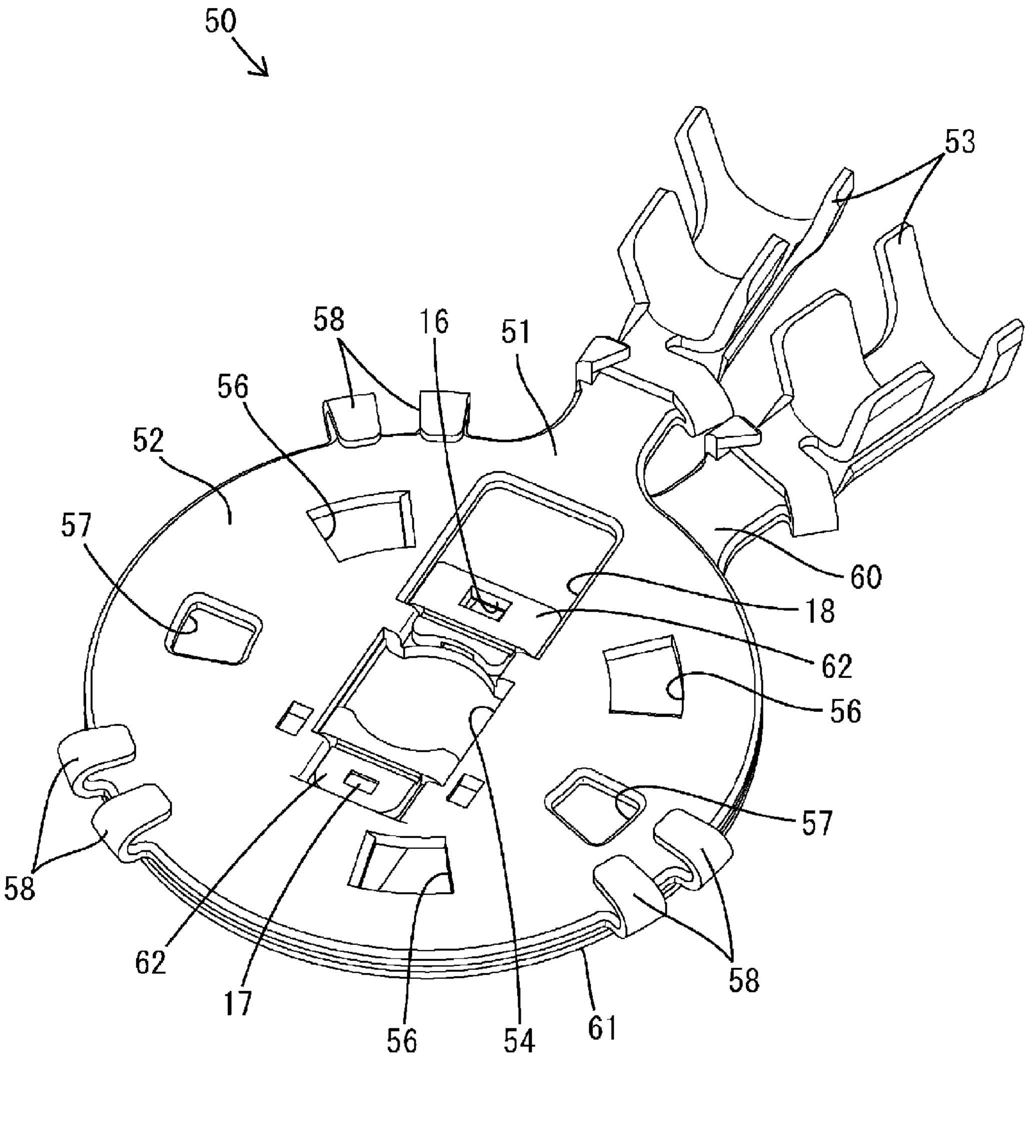
FIG. 7 is a perspective view of a second terminal module.
Figure 8:
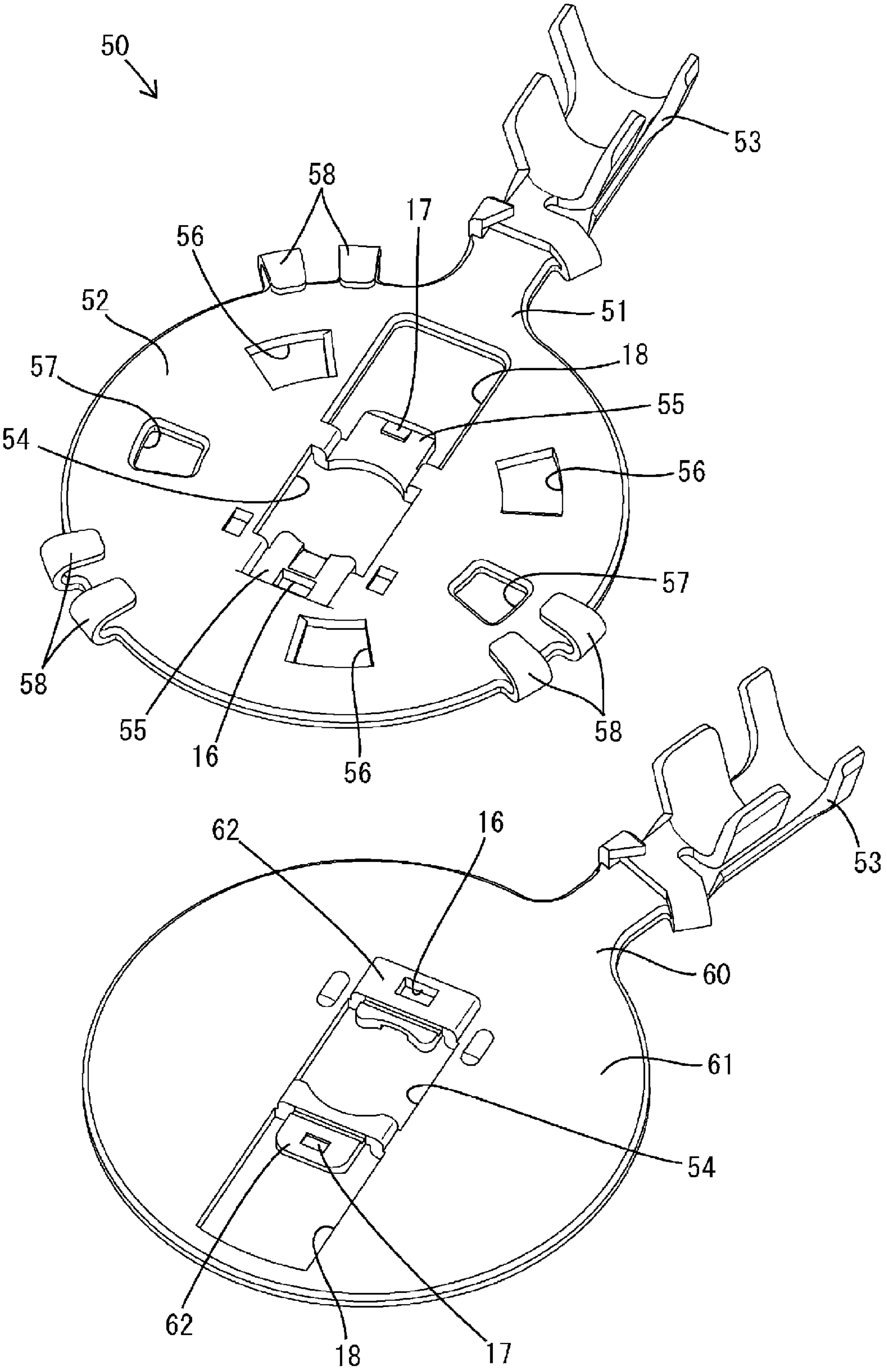
FIG. 8 is a perspective view showing a separated state of a second terminal fitting and a second sub-terminal.
Figure 9:
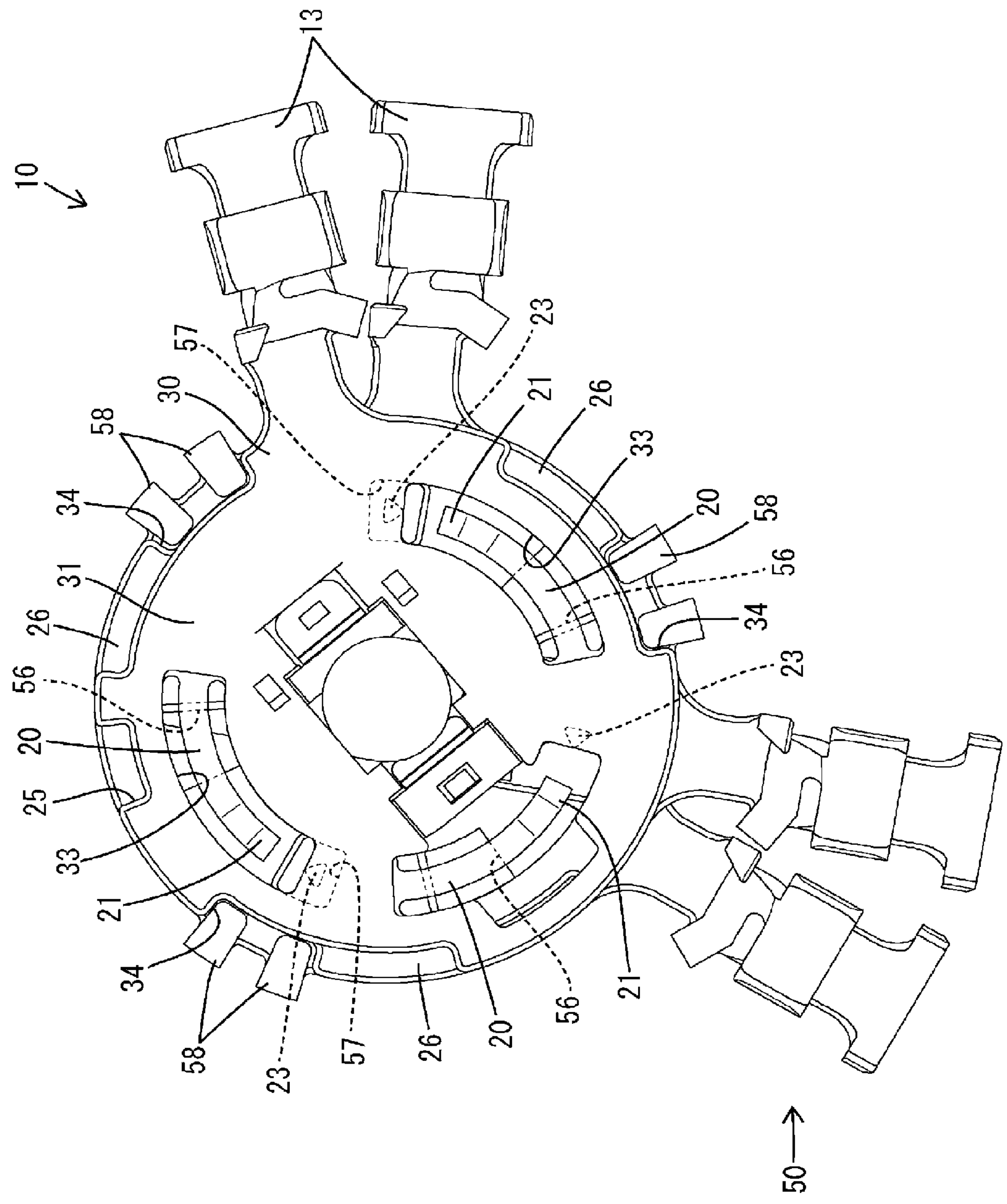
FIG. 9 is a plan view showing a state where the assembly of the first and second terminal modules is started.
Figure 10:
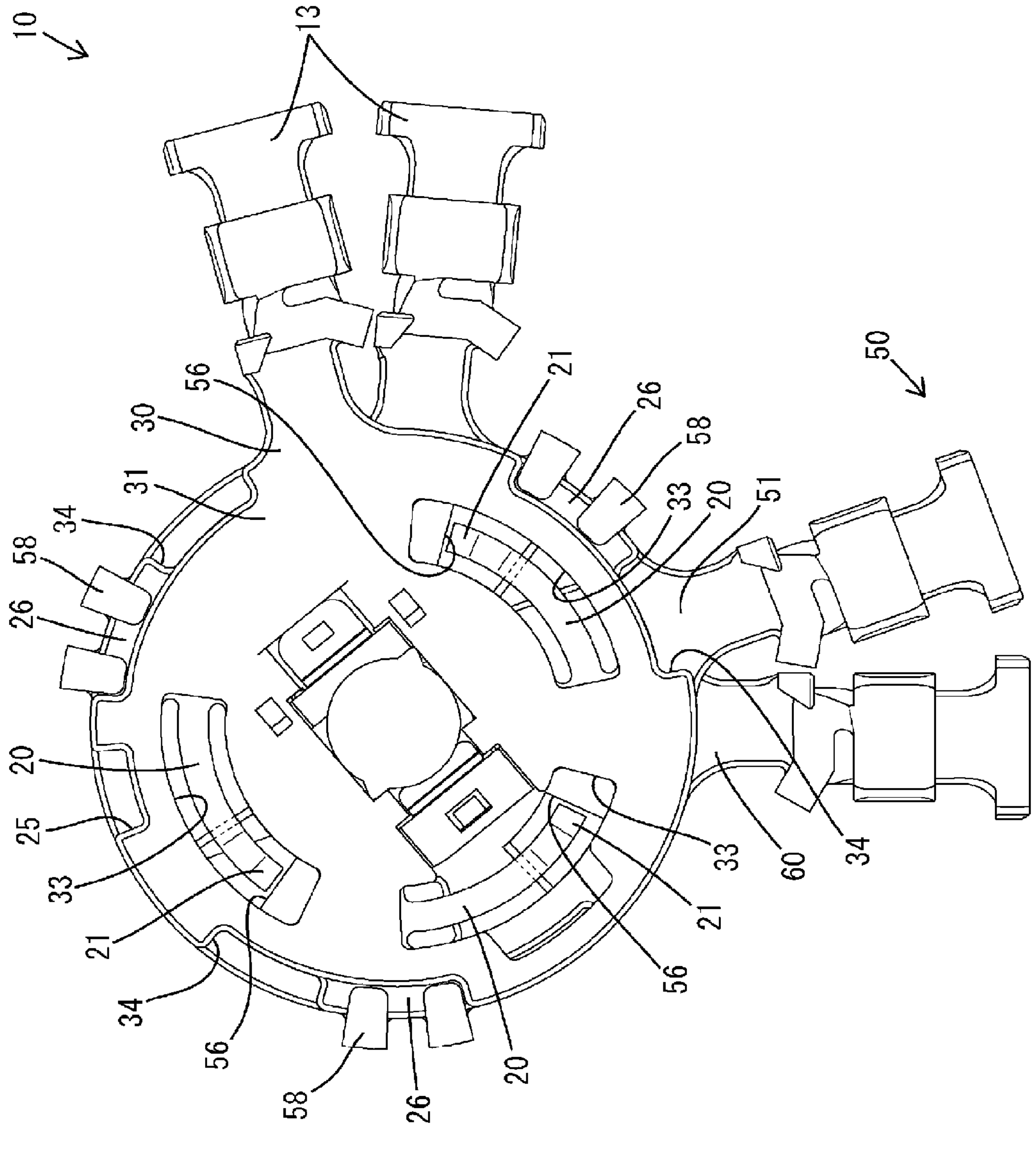
FIG. 10 is a plan view showing a state where the assembly of the first and second terminal modules is completed.

The second terminal fitting 51 is a single component formed, such as by bending a metal plate material having a predetermined shape. As shown in FIGS. 7 and 8, the second terminal fitting 51 includes a second base plate portion 52 having a plate thickness direction oriented in the vertical direction and one second crimping portion 53. The second base plate portion 52 is circular in a plan view. The second crimping portion 53 projects radially outward from the outer peripheral edge of the second base plate portion 52. A second bolt hole 54 penetrating through the second base plate portion 52 in the plate thickness direction is formed in a central part of the second base plate portion 52.

A pair of second receiving portions 55 arranged across a center of the second bolt hole 54 are formed on a hole edge part of the second bolt hole 54. The second receiving portions 55 are arranged at positions lower than the second base plate portion 52 via steps by a plate thickness of the second base plate portion 52. One first receiving portion 55 is formed with a locking hole 16, and the other second receiving portion 55 is formed with a locking projection 17. A through hole 18 is formed at a position of the second base plate portion 52 on a side opposite to the second bolt hole 54 across the other second receiving portion 55.

The second base plate portion 52 is formed with three lock portions 56 spaced apart in the circumferential direction. The lock portion 56 is in the form of a hole penetrating through the second base plate portion 52 in the plate thickness direction. The intervals of the lock portions 56 in the circumferential direction are the same as those of the three resilient lock pieces 20. The three lock portions 56 are arranged on a circumference having the same diameter as a circle constituted by the resilient lock pieces 20.

The second base plate portion 52 is formed with two interference avoiding portions 57. The two interference avoiding portions 57 are formed to penetrate through the second base plate portion 52 in the plate thickness direction. The two interference avoiding portions 57 and the through hole 18 of the second base plate portion 52 are arranged in such a positional relationship that the three contact point portions 23 can be simultaneously accommodated.

Three pairs of folded portions 58 are formed on the outer peripheral edge of the second base plate portion 52. The pair of folded portions 58 are arranged closely side by side in the circumferential direction. The three pairs of folded portions 58 are arranged at the same intervals as the three plate-like fitting portions 26 in the circumferential direction. Each folded portion 58 has a cantilever shape extending radially inward by being folded toward an upper surface side of the second base plate portion 52 from the outer peripheral edge of the second base plate portion 52. An interval between the upper surface of the second base plate portion 52 and the lower surface of the folded portion 58 is set to be equal to or slightly smaller than a plate thickness of the plate-like fitting portion 26 of the first base plate portion 12.

The second sub-terminal 60 is a single component formed, such as by bending a metal plate material having a predetermined shape. The second sub-terminal 60 includes a second plate-like base portion 61 having a plate thickness direction oriented in the vertical direction and a second crimping portion 53 in the form of an open barrel. The second plate-like base portion 61 is circular in a plan view. The second crimping portion 53 projects radially outward from the outer peripheral edge of the second plate-like base portion 61. A second bolt hole 54 penetrating through the second plate-like base portion 61 in the plate thickness direction is formed in a central part of the second plate-like base portion 61.

A pair of second covering portions 62 arranged across a center of the second bolt hole 54 are formed on a hole edge part of the second bolt hole 54. The second covering portions 62 are arranged at positions higher than the second plate-like base portion 61 via steps by a plate thickness of the second plate-like base portion 61. One second covering portion 62 is formed with a locking hole 16, and the other second covering portion 62 is formed with a downward projecting locking projection 17. A through hole 18 is formed at a position of the second plate-like base portion 61 on a side opposite to the second bolt hole 54 across the other second covering portion 62.

With the second terminal fitting 51 and the second sub-terminal 60 assembled, the second base plate portion 52 is stacked on the upper surface of second plate-like base portion 61 and the second covering portions 62 are stacked on the upper surfaces of the second receiving portions 55, whereby the second terminal fitting 51 and the second sub-terminal 60 are held not to be separated in the plate thickness direction. By locking the locking projection 17 and the locking hole 16 of the second covering portions 62 to the locking hole 16 and the locking projection 17 of the second receiving portions 55, the second terminal fitting 51 and the second sub-terminal 60 are held not to be separated in a horizontal direction orthogonal to a stacking direction. The second bolt hole 54 of the second terminal fitting 51 and the second bolt hole 54 of the second sub-terminal 60 are coaxially arranged. The second crimping portion 53 of the second terminal fitting 51 and the second crimping portion 53 of the second sub-terminal 60 are adjacently arranged in the circumferential direction.

<Assembly Procedure of Combination Terminal>

Before the first and second terminal modules 10, 50 are assembled, the first terminal module 10 and the protecting member 40 are assembled. In assembling, the first base plate portion 12 and the first plate-like base portion 31 of the first terminal module 10 are dropped from above and accommodated into the protecting member 40. At this time, the rotation stop protrusion 46 is fit into the rotation stop recess 25 and the three positioning portions 34 are fit to the three projecting portions 44, whereby the first terminal module 10 is positioned in the circumferential direction with respect to the protecting member 40. In the process of fitting the first terminal module 10, base end parts of the two first crimping portions 13 are accommodated into the first cut portion 41.

When the first terminal module 10 is assembled with the protecting member 40, the first crimping portions 13 are placed on the bottom surface of the first cut portion 41 and the first base plate portion 12 passes through the retaining projections 45. The retaining projections 45 are locked to the outer peripheral edge part of the upper surface of the first base plate portion 12, whereby the first terminal module 10 is restricted from being separated upward with respect to the protecting member 40. Since the rotation stop protrusion 46 is kept fit in the rotation stop recess 25, the first terminal module 10 is positioned with respect to the protecting member 40 and kept in a state where relative rotation with respect to the protecting member 40 is restricted.

Figure 5:
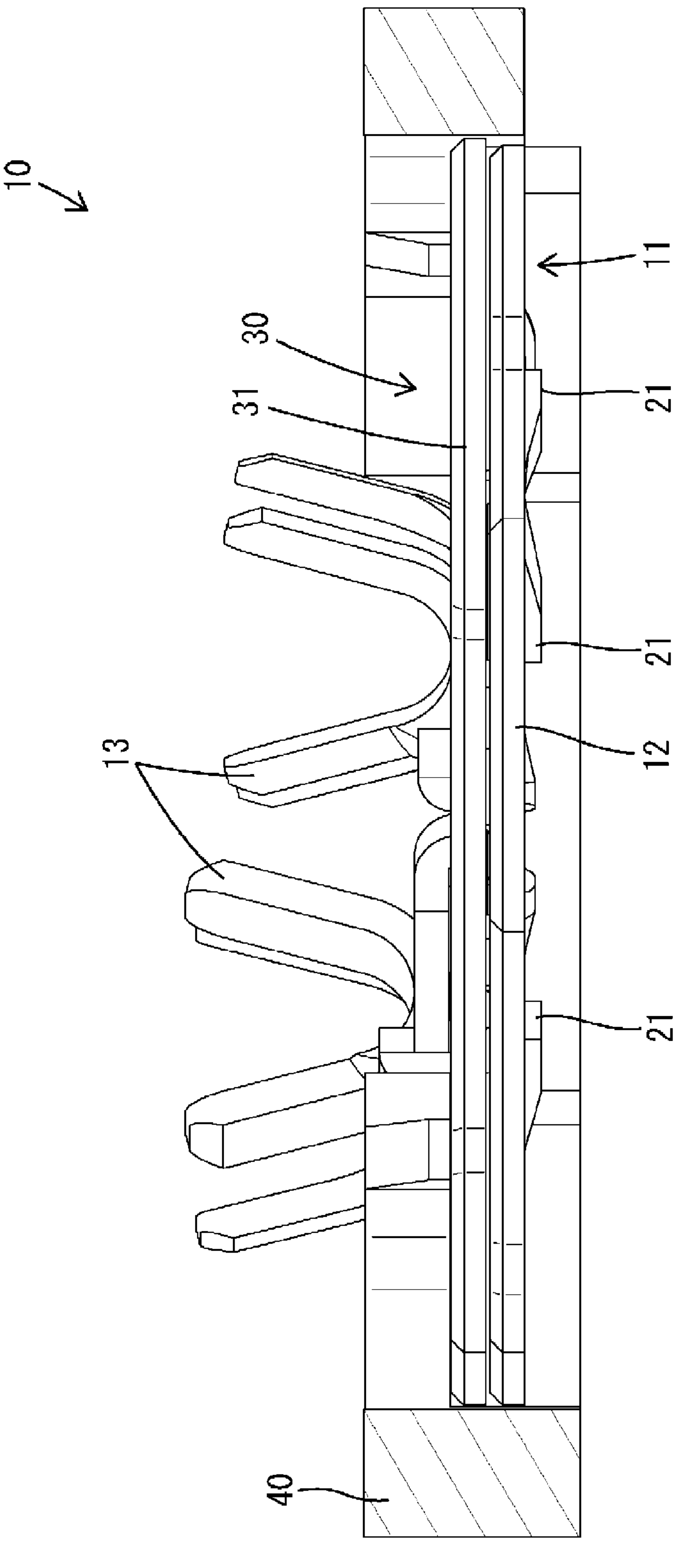
FIG. 5 is a section showing an assembled state of the first terminal module and the protecting member.

As shown in FIG. 5, the extending end parts 21 of the three resilient lock pieces 20 formed in the first terminal fitting 11 project further downward than the first base plate portion 12. Thus, there is a concern that an external matter interferes with the extending end parts 21 of the resilient lock pieces 20 and the resilient lock pieces 20 are plastically deformed. However, since the lower surface of the protecting member 40 is located below the extending end parts 21 of the resilient lock pieces 20, there is no possibility that an external matter interferes with the extending end parts 21 of the resilient lock pieces 20.

After the first terminal module 10 and the protecting member 40 are assembled, the second terminal module 50 is assembled with the first terminal module 10. In assembling, the second base plate portion 52 and the second plate-like base portion 61 of the second terminal module 50 are accommodated into the protecting member 40 from below and the upper surface of the second base plate portion 52 is brought closer to the lower surface of the first base plate portion 12 while facing the lower surface of the first base plate portion 12. At this time, the three pairs of folded portions 58 are accommodated into the three third cut portions 43 and the two second crimping portions 53 are accommodated into the second cut portion 42. By fitting the three pairs of folded portions 58 into the three positioning portions 34, the second terminal module 50 is positioned in the circumferential direction with respect to the protecting member 40 and the first terminal module 10. The outer peripheral edge of the second terminal module 50 comes into contact with the guide surfaces 47, whereby the both terminal modules 10, 50 are concentrically positioned and the first bolt holes 14 and the second bolt holes 54 are concentrically arranged.

Since the first terminal module 10 includes the contact point portions 23 projecting downward from the lower surface of the first base plate portion 12, there is a concern that the contact point portions 23 interfere with the upper surface of the second base plate portion 52. However, if the second terminal module 50 is positioned with respect to the first terminal module 10, the contact point portions 23 are accommodated into the interference avoiding portions 57, wherefore the contact point portions 23 do not interfere with the second base plate portion 52. In this way, the first and second base plate portions 12, 52 are stacked with the upper surface of the second base plate portion 52 held in contact with the lower surface of the first base plate portion 12.

If the first and second base plate portions 12, 52 are stacked in contact, the extending end parts 21 of the resilient lock pieces 20 are in contact with the upper surface of the second base plate portion 52, wherefore the resilient lock pieces 20 are pressed upward by the second base plate portion 52. Since the deflection allowance spaces 33 formed in the first sub-terminal 30 are secured above the resilient lock pieces 20, the resilient lock pieces 20 are resiliently displaced upward while entering the deflection allowance spaces 33. Therefore, there is no possibility that the resilient lock pieces 20 are plastically deformed by being sandwiched between the first plate-like base portion 31 and the second base plate portion 52.

After the second terminal module 50 is positioned with respect to the first terminal module 10 and temporarily assembled, the second terminal module 50 is relatively rotated in the counterclockwise direction with respect to the first terminal module 10 and the protecting member 40 in a plan view. In the circumferential direction, a rotation direction of the second terminal module 50 is the same direction as an extending direction of the cantilevered resilient lock pieces 20.

In the process of relatively rotating the both terminal modules 10, 50, the outer peripheral surface of the second base plate portion 52 and that of the second plate-like base portion 61 slide in contact with the guide surfaces 47, whereby the both terminal modules 10, 50 are kept concentrically positioned. As the relative rotation of the both terminal modules 10, 50 proceeds, the plate-like fitting portions 26 are slipped and fit between the second base plate portion 52 and the folded portions 58. In the process of assembling the both terminal modules 10, 50, the extending end parts 21 of the resilient lock pieces 20 slide in contact with the upper surface of the second base plate portion 52 and the resilient lock pieces 20 enter the deflection allowance spaces 33 and are kept relatively displaced.

When the assembly of the both terminal fittings 10, 50 is completed, the resilient lock pieces 20 resiliently return and the extending end parts 21 of the resilient lock pieces 20 enter the lock portions 56. The tip edges of the extending end parts 21 of the resilient lock pieces 20 face the inner surfaces of the lock portions 56 in the circumferential direction in such a positional relationship as to be lockable to the inner surfaces of the lock portions 56. A facing direction of the extending end part 21 with respect to the lock portion 56 is a direction opposite to an assembly direction of the first terminal module 10 with the second terminal module 50.

Since the extending end parts 21 of the resilient lock pieces 20 and the lock portions 56 are facing each other in such a positional relationship as to be lockable to each other, the first and second terminal modules 10, 50 in the assembled state are locked in an inseparable state in the circumferential direction. As the assembly of the both terminal modules 10, 50 proceeds, the contact point portions 23 accommodated in the interference avoiding portions 57 come into contact with the second base plate portion 52, whereby the first and second terminal modules 10, 50 are connected with a predetermined contact pressure. In the above way, the assembly of the combination terminal composed of the first terminal module 10, the protecting member 40 and the second terminal module 50 is completed.

The combination terminal of this embodiment is provided with the first terminal fitting 11 including the first base plate portion 12, the second terminal fitting 51 including the second base plate portion 52 to be stacked on the first base plate portion 12 and the protecting member 40. The second terminal fitting 51 is assembled with the first terminal fitting 11 by being displaced in a direction intersecting the stacking direction of the both base plate portions 12, 52. The first terminal fitting 11 is formed with the resiliently deformable resilient lock pieces 20. The second terminal fitting 51 is formed with the lock portions 56 for locking the both terminal fittings 11, 51 in the assembled state by being locked to the resilient lock pieces 20. The protecting member 40 for preventing the interference of an external matter with the resilient lock pieces 20 is attached to the first terminal fitting 11.

In the process of assembling the both terminal fittings 11, 51, the resilient lock pieces 20 are resiliently deformed. Since resistance generated in the process of assembling the both terminal fittings 11, 51 is small as compared to the case where terminal fittings are assembled while a resiliently undeformable projection is strongly rubbed against the mating terminal fitting, manual assembly is possible. Since the interference of an external matter with the resilient lock pieces 20 is prevented by the protecting member 40, there is no possibility that the resilient lock pieces 20 are plastically deformed. Therefore, the reliability of a locking function by the resilient lock pieces 20 and the lock portions 56 is high.

Since the protecting member 40 has the guide surfaces 47 to be brought into sliding contact with the second terminal fitting 51 in the process of assembling the both terminal fittings 11, 51, workability when the both terminal fittings 11, 51 are assembled is good. In the combination terminal of this embodiment, the shape of the first terminal fitting 11 can be simplified as compared to the case where the guide surfaces 47 are formed on the first terminal fitting 11.

The both terminal fittings 11, 51 are assembled while being relatively rotated. The resilient lock piece 20 has an arc shape extending concentrically with a center of rotation at the time of assembling the both terminal fittings 11, 51. According to this configuration, a large extension dimension of the resilient lock piece 20 can be ensured even without increasing external dimensions of the first terminal fitting 11. By ensuring the long extension dimension of the resilient lock piece 20, sliding resistance due to the resilient deformation of the resilient lock piece 20 can be reduced in the process of assembling the both terminal fittings 11, 51.

The first terminal module 10 is provided with the first sub-terminal 30 to be stacked and assembled with the first terminal fitting 11. The first terminal fitting 11 and the first sub-terminal 30 are formed with the positioning portions 34 for positioning the second terminal fitting 51 when the assembly of the both terminal fittings 11, 51 is started. According to this configuration, workability in assembling the both terminal fittings 11, 51 is good.

The first terminal module 10 is provided with the first sub-terminal 30 to be stacked and assembled with the first terminal fitting 11 from the upper surface side opposite to the second terminal fitting 51. The resilient lock pieces 20 are resiliently displaced toward the first sub-terminal 30 due to interference with the second terminal fitting 51 in the process of assembling the both terminal fittings 11, 51. The resilient lock pieces 20 resiliently return and are locked to the lock portions 56 when the assembly of the both terminal fittings 11, 51 is completed. The first sub-terminal 30 is formed with the deflection allowance spaces 33 for enabling the resiliently deformation of the resilient lock pieces 20. According to this configuration, since the deflection allowance spaces 33 during resilient displacements of the resilient lock pieces 20 are secured within a thickness range of the first sub-terminal 30, it is not necessary to secure spaces serving as the deflection allowance spaces 33 for the resilient lock pieces 20 between the upper surface of the first terminal fitting 11 and the lower surface of the first sub-terminal 30. In this way, a height reduction of the first terminal module 10 is realized.

The first base plate portion 12 includes the projection-like contact point portions 23 to be brought into contact with the second base plate portion 52 with the assembly of the both terminal fittings 11, 51 completed. The second base plate portion 52 is formed with the interference avoiding portions 57 for avoiding interference with the contact point portions 23 when the assembly of the both terminal fittings 11, 51 is started. Since the both base plate portions 12, 52 can be stacked without any gap formed therebetween in this way, a height reduction of the combination terminal is realized.

OTHER EMBODIMENTS

The present invention is not limited to the above described and illustrated embodiment, but is represented by claims. The present invention is intended to include all changes in the scope of claims and in the meaning and scope of equivalents and also include the following embodiments.

Although one first terminal fitting is formed with three resilient lock pieces in the above embodiment, the number of the resilient lock pieces formed in one first terminal fitting may be two or less or four or more.

Although the resilient lock piece has an arc shape extending concentrically with the center of rotation at the time of assembling the both terminal fittings in the above embodiment, the resilient lock piece may be shaped to extend in a radial direction intersecting the assembly direction of the both terminal fittings.

Although the first and second terminal fittings are assembled while being rotated in the above embodiment, the first and second terminal fittings may be assembled while being linearly and parallelly moved.

Although the deflection allowance spaces for the resilient lock pieces in the process of assembling of the both terminal fittings are secured within the plate thickness range of the first sub-terminal in the above embodiment, the deflection allowance spaces for the resilient lock pieces may be secured between the upper surface of the first terminal fitting and the lower surface of the first sub-terminal.

Although the protecting member has the guide surfaces to be brought into sliding contact with the second terminal fitting in the above embodiment, the protecting member may include no guide surface. In this case, guide surface(s) to be brought into sliding contact with the second terminal fitting may be formed on the first terminal fitting.

Although the positioning portions for positioning the second terminal fitting when the assembly of the both terminal fittings is started are formed in the first terminal fitting and the first sub-terminal in the above embodiment, positioning portion(s) for positioning the second terminal fitting may be formed in the protecting member.

LIST OF REFERENCE NUMERALS

10 . . . first terminal module
11 . . . first terminal fitting
12 . . . first base plate portion
13 . . . first crimping portion
14 . . . first bolt hole
15 . . . first covering portion
16 . . . locking hole
17 . . . locking projection
18 . . . through hole
20 . . . resilient lock piece
21 . . . extending end part
23 . . . contact point portion
24 . . . positioning recess
25 . . . rotation stop recess
26 . . . plate-like fitting portion
30 . . . first sub-terminal
31 . . . first plate-like base portion
32 . . . first receiving portion
33 . . . deflection allowance space
34 . . . positioning portion 40 . . . protecting member
41 . . . first cut portion
42 . . . second cut portion
43 . . . third cut portion
44 . . . projecting portion
45 . . . retaining projection
46 . . . rotation stop protrusion
47 . . . guide surface
50 . . . second terminal module
51 . . . second terminal fitting
52 . . . second base plate portion
53 . . . second crimping portion
54 . . . second bolt hole
55 . . . second receiving portion
56 . . . lock portion
57 . . . interference avoiding portion
58 . . . folded portion
60 . . . second sub-terminal
61 . . . second plate-like base portion
62 . . . second covering portion

What is claimed is:

1. A combination terminal, comprising:

a first terminal fitting including a first base plate portion; and a second terminal fitting including a second base plate portion to be stacked on the first base plate portion, the second terminal fitting being assembled with the first terminal fitting by being displaced in a direction intersecting a stacking direction, the first terminal fitting being formed with a resiliently deformable resilient lock piece and a first positioning portion, the second terminal fitting being formed with:

a lock portion for locking the first and second terminal fittings in an assembled state by being locked to the resilient lock piece; and a second positioning portion to be fit to the first positioning portion, and a protecting member for preventing interference of an external matter with the resilient lock piece being attached to the first terminal fitting, wherein the first positioning portion is configured to position the second positioning portion when assembly of the first and second terminal fittings is started, and the first positioning portion is disposed radially outward of the resilient lock piece.

2. The combination terminal of claim 1, wherein the protecting member has a guide surface to be brought into sliding contact with the second terminal fitting in the process of assembling the first and second terminal fittings.

3. The combination terminal of claim 1, wherein:

the first and second terminal fittings are assembled while being relatively rotated, and the resilient lock piece has an arc shape extending concentrically with a center of rotation at the time of assembling the first and second terminal fittings.

4. The combination terminal of claim 1, comprising a first sub-terminal to be stacked and assembled with the first terminal fitting, wherein:

the first sub-terminal is formed with a third positioning portion for positioning the second terminal fitting when the assembly of the first and second terminal fittings is started.

5. The combination terminal of claim 1, comprising a first sub-terminal to be stacked and assembled with the first terminal fitting from a side opposite to the second terminal fitting, wherein:

the resilient lock piece is resiliently displaced toward the first sub-terminal due to interference with the second terminal fitting in the process of assembling the first and second terminal fittings and resiliently returns and is locked to the lock portion when assembly of the first and second terminal fittings is completed, and the first sub-terminal is formed with a deflection allowance space for enabling resilient deformation of the resilient lock piece.

6. The combination terminal of claim 1, wherein:

the first base plate portion includes a projection-like contact point portion to be brought into contact with the second base plate portion with assembly of the first and second terminal fittings completed, and the second base plate portion is formed with an interference avoiding portion for avoiding interference with the contact point portion when the assembly of the first and second terminal fittings is started.

7. The combination terminal of claim 1, wherein the first positing portion includes a positioning recess, and the second positioning portion includes a folded portion.

8. The combination terminal of claim 7, wherein the first terminal fitting further includes a fitting portion to be fit to the folded portion in the assembled state.

* * * * *